United States Patent
Lunttila et al.

(10) Patent No.: US 11,160,100 B2
(45) Date of Patent: Oct. 26, 2021

(54) UPLINK CONTROL INFORMATION MULTIPLEXING

(71) Applicant: Nokia Technologies Oy, Espoo (FI)

(72) Inventors: Timo Lunttila, Espoo (FI); Juha Korhonen, Espoo (FI); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 16/339,984

(22) PCT Filed: Sep. 4, 2017

(86) PCT No.: PCT/FI2017/050615
§ 371 (c)(1),
(2) Date: Apr. 5, 2019

(87) PCT Pub. No.: WO2018/069569
PCT Pub. Date: Apr. 19, 2018

(65) Prior Publication Data
US 2020/0045721 A1 Feb. 6, 2020

Related U.S. Application Data

(60) Provisional application No. 62/406,137, filed on Oct. 10, 2016.

(51) Int. Cl.
*H04W 72/12* (2009.01)
*H04L 5/00* (2006.01)
*H04W 72/04* (2009.01)

(52) U.S. Cl.
CPC ....... *H04W 72/1273* (2013.01); *H04L 5/0055* (2013.01); *H04L 5/0082* (2013.01); *H04W 72/0446* (2013.01); *H04L 5/0078* (2013.01)

(58) Field of Classification Search
None
See application file for complete search history.

(56) References Cited

U.S. PATENT DOCUMENTS

2005/0249120 A1* 11/2005 Heo ............... H04L 1/1874
370/236
2015/0296497 A1 10/2015 Nguyen et al.
(Continued)

FOREIGN PATENT DOCUMENTS

RU 2117314 C1 8/1998
RU 2168278 C2 5/2001
(Continued)

OTHER PUBLICATIONS

"New SI proposal: Study on Latency Reduction Techniques for LTE", 3GPP TSG-RAN meeting #67, RP-150465, Agenda: 13.1.2, Ericsson, Mar. 9-12, 2015, 7 pages.
(Continued)

*Primary Examiner* — Bunjob Jaroenchonwanit
(74) *Attorney, Agent, or Firm* — Harrington & Smith

(57) ABSTRACT

Multiplexing of information may be useful in a variety of communication scenarios, such as communication of control information. For example, certain wireless communication systems may benefit from uplink control information multiplexing for downlink two orthogonal frequency division multiplexed symbol short transmission time interval and one millisecond transmission time interval. A method can include receiving, at a user equipment, a downlink assignment scheduling first downlink data transmission in a first transmission time interval duration. The method can also include determining when to provide acknowledgment feedback in an uplink corresponding to the scheduled downlink data transmission. The determination can take into account whether the user equipment is scheduled for downlink data transmission in a second transmission time interval duration.

(Continued)

The second transmission time interval duration can be shorter than the first transmission time interval duration.

20 Claims, 6 Drawing Sheets

(56) References Cited

U.S. PATENT DOCUMENTS

| | | | |
|---|---|---|---|
| 2016/0095137 A1* | 3/2016 | Chen | H04L 25/0224 370/329 |
| 2016/0174238 A1* | 6/2016 | Chen | H04L 1/0045 370/336 |
| 2016/0234857 A1* | 8/2016 | Chen | H04W 72/1231 |
| 2017/0208575 A1* | 7/2017 | Chen | H04W 72/0406 |
| 2017/0290008 A1* | 10/2017 | Tooher | H04L 1/0007 |
| 2019/0132838 A1* | 5/2019 | Yi | H04L 5/0007 |
| 2019/0373545 A1* | 12/2019 | Nammi | H04W 72/0433 |
| 2020/0163112 A1* | 5/2020 | Lee | H04L 5/0094 |
| 2020/0170034 A1* | 5/2020 | Kim | H04W 72/1289 |

FOREIGN PATENT DOCUMENTS

| | | |
|---|---|---|
| WO | 2010/044328 A1 | 4/2010 |
| WO | 2016/040290 A1 | 3/2016 |
| WO | 2016/144243 A1 | 9/2016 |
| WO | 2017/168039 A1 | 10/2017 |

OTHER PUBLICATIONS

"Revised Work Item on Shortened TTI and Processing Time for LTE", 3GPP TSG-RAN meeting #73, RP-161922, Agenda: 10.11.1, Ericsson, Sep. 19-22, 2016, 8 pages.

"3rd Generation Partnership Project; Technical Specification Group Radio Access Network; Evolved Universal Terrestrial Radio Access (E-UTRA); Study on latency reduction techniques for LTE (Release 14)", 3GPP TR 36.881, V14.0.0, Jun. 2016, pp. 1-249.

International Search Report and Written Opinion received for corresponding Patent Cooperation Treaty Application No. PCT/FI2017/050615, dated Nov. 8, 2017, 17 pages.

Office action received for corresponding Russian Patent Application No. 2019112318, dated Nov. 7, 2019, 9 pages of office action and no page of translation available.

Extended European Search Report received for corresponding European Patent Application No. 17860081.3, dated May 13, 2020, 16 pages.

"HARQ with Shortened Processing Time for 1ms TTI", 3GPP TSG RAN WG1 Meeting #86bis, R1-1609340, Agenda: 7.2.10.1, ZTE, Oct. 10-14, 2016, pp. 1-10.

"WF on PUCCH Resource Allocation for Shortened Processing Time for 1ms TT!", 3GPP TSG RAN1 #86 , R1-168232, Agenda: 7.2.12.1, LG Electronics, Aug. 22-26, 2016, 4 pages.

"HARQ Feedback for sTTI Scheduling", 3GPP TSG RAN WG1 Meeting #85, R1-164584, Agenda: 6.2.10.4, Spreadtrum Communications, May 23-27, 2016, pp. 1-3.

Office action received for corresponding Indian Patent Application No. 201947015115, dated Sep. 28, 2020, 11 pages.

* cited by examiner

UPLINK CONTROL INFORMATION MULTIPLEXING

RELATED APPLICATION

This application was originally filed as PCT Application No. PCT/FI2017/050615, filed on 4 Sep. 2017, which claims priority benefit from U.S. application Ser. No. 62/406137, filed on 10 Oct. 2016.

CROSS-REFERENCE TO RELATED APPLICATION

This application is related to and claims the benefit and priority of U.S. Provisional Patent Application No. 62/406,137, which was filed on Oct. 10, 2016, the entirety of which is hereby incorporated herein by reference.

BACKGROUND

Field

Multiplexing of information may be useful in a variety of communication scenarios, such as communication of control information. For example, certain wireless communication systems may benefit from uplink control information multiplexing for downlink two orthogonal frequency division multiplexed symbol short transmission time interval and one millisecond transmission time interval.

Description of the Related Art

Long term evolution (LTE) Advanced (LTE-Advanced) Pro system will be part of third generation partnership project (3GPP) LTE release 14/15 (Rel-14/15). Latency reduction for such systems is discussed in the Rel-13 study item "Study on Latency reduction techniques" (RP-150465), and the follow-up Rel-14 work item RP-161922, based on the study item. The conclusions of the study item, captured in TR 36.881, indicate that a processing time reduction can improve physical layer radio latency. Similar issues may arise in connection with other systems, such as fifth generation (5G)/new radio.

Processing time reduction can occur through the use of short transmission time interval (sTTI) operation. Short transmission time interval is also sometimes referred to as shorter transmission time interval.

For frame structure type 1, support for a transmission duration may be based on 2-symbol sTTI and 1-slot (i.e. 7-symbol) sTTI for short physical downlink shared channel (sPDSCH)/short shared physical downlink control channel (sPDCCH). Support for a transmission duration may be based on 2-symbol sTTI, 4-symbol sTTI, and 1-slot sTTI for short physical uplink control channel (sPUCCH)/short physical uplink shared channel (sPUSCH). Down-selection of the sTTI lengths may not be precluded.

Dynamic switching between 2-symbol and legacy 1 ms (i.e. 14-symbol) TTIs may be beneficial. Low priority traffic may benefit from lower reference symbol (RS) and control overhead of 1 ms TTI and the high priority traffic may benefit from latency reduction offered by 2-symbol TTI.

FIG. 1 illustrates feedback when the length of a transmission time interval changes. In FIG. 1, the diagonal lines from the downlink (DL) row to the UL row show the timing relation between DL data reception and hybrid automatic repeat request (HARQ) acknowledgement (ACK) transmission in the UL.

More particularly, FIG. 1 shows a transition from a fourteen orthogonal frequency division multiplexed (OFDM) symbol (14-OS) or 1 ms TTI to a two OFDM symbol (2-OS) physical downlink shared channel (PDSCH) sTTI. HARQ feedback generation with 14-OS in this example requires n+3 TTI, i.e. n+42 symbol, user equipment (UE) processing time. Moreover, HARQ feedback generation with 2-OS in this example requires n+7 sTTI, i.e. n+14 symbol processing time. In this case, continuous DL scheduling, shown in section (a) would mean that UE should provide HARQ feedback for a 14-OS transmission and six 2-OS transmissions in subframes (SFs) 5 and 6.

One option to handle the TTI length change is that an evolved Node B (eNB) leaves a scheduling gap such that UE does not provide feedback simultaneously for PDSCH transmissions with different TTI lengths. This is depicted in section (b) of FIG. 1, in which SF 2 and 3 have no corresponding feedback because eNB does not schedule PDSCH transmission in those subframes. For situations where the eNB needs to urgently shift to the shorter TTI, a rule could be that UE neglects DL data sent with longer TTI if HARQ feedback for that TTI would overlap with the feedback for the shorter TTI data.

If a scheduling gap (DL SF 2 and 3) is provided in the DL such that HARQ-ACK feedback for 2-OS sTTI and 14-OS TTI cannot coincide in a single subframe, downlink resources that cannot be assigned for the user can cause a degradation in the user perceived throughput.

With continuous DL scheduling, an UL transition time appears during which UE needs to provide feedback for both 2-OS sTTI and 14-OS TTI. In FIG. 1, the transition time correspond to SF 5 and 6. During the transition time it is necessary to operate UL with sTTI at least for transmitting HARQ feedback for sPDSCH transmissions. Otherwise, feedback for sPDSCH would be delayed up to nearly 1 ms in the worst case, which would mean losing partly the latency benefit of DL sTTI.

SUMMARY

According to a first embodiment, a method can include receiving, at a user equipment, a downlink assignment scheduling first downlink data transmission in a first transmission time interval duration. The method can also include determining when to provide acknowledgment feedback in an uplink corresponding to the scheduled downlink data transmission. The determination can take into account whether transmitting the acknowledgement feedback in a given subframe would collide with signaling associated with a second transmission time interval duration. The collision can be that the user equipment is scheduled for downlink data transmission in the second transmission time interval duration requiring the acknowledgment feedback in the given subframe or is scheduled for uplink data transmission in the given subframe. The second transmission time interval duration can be shorter than the first transmission time interval duration.

In a variant, the uplink data transmission can be a scheduled short physical uplink shared channel transmission in the given subframe.

In a variant, when the user equipment is scheduled for second downlink data transmission or uplink data transmission in the second transmission time interval duration, the method can further include transmitting the acknowledgment feedback corresponding to the first transmission interval duration in a reserved transmission time interval of the second transmission time interval duration.

In a variant, when the user equipment is not scheduled for downlink data transmission or uplink data transmission in the second transmission time interval duration, the method can further include transmitting the acknowledgment feedback corresponding to the first transmission interval duration in a transmission time interval having a predetermined offset.

In a variant, the first downlink data transmission can include a physical downlink shared channel.

In a variant, the first transmission time interval duration can be one millisecond.

In a variant, the second downlink data transmission can include a short physical downlink shared channel.

In a variant, the second transmission time interval duration can be two orthogonal frequency division multiplex symbols.

In a variant, the reserved transmission time interval can include a special short transmission time interval.

In a variant, the reserved transmission time interval can include a transmission time interval in which acknowledgment feedback for the second transmission time interval duration cannot be sent.

In a variant, the predetermined offset can be an integer number of transmission time intervals.

In a variant, the method can further include receiving an indication to operate in low latency mode.

In a variant the indication can be provided by radio resource control configuration.

According to a second embodiment, a method can include sending, to a user equipment, a downlink assignment scheduling first downlink data transmission in a first transmission time interval duration. The method can also include determining when to expect acknowledgment feedback in an uplink corresponding to the scheduled downlink data transmission. The determination can take into account whether the user equipment is scheduled for downlink or uplink data transmission in a second transmission time interval duration. The second transmission time interval duration can be shorter than the first transmission time interval duration.

In a variant, when the user equipment is scheduled for second downlink data transmission or uplink data transmission in the second transmission time interval duration, the method can further include receiving the acknowledgment feedback corresponding to the first transmission interval duration in a reserved transmission time interval of the second transmission time interval duration.

In a variant, when the user equipment is not scheduled for downlink data transmission or uplink data transmission in the second transmission time interval duration, the method can further include receiving the acknowledgment feedback corresponding to the first transmission interval duration in a transmission time interval having a predetermined offset.

In a variant, the method can further include sending an indication to operate in low latency mode.

In a variant the indication can be sent by radio resource control configuration.

The second embodiment can also include any of the variants of the first embodiment.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Certain embodiments focus on, for example, dynamic switching between 1-ms TTI as well as 2-symbol TTI, considering especially signaling design for the associated UL control information (UCI), in particular HARQ-ACK.

In order to guarantee reliable, flexible and efficient short TTI operation in the downlink, it may be valuable to support dynamic switching between 1-ms TTI and a short TTI. With 2-symbol sTTI, the processing time required from sPDSCH reception in the DL until the transmission of corresponding HARQ-ACK feedback in the UL on sPUCCH or sPUSCH may be reduced compared to the current LTE timing. Moreover, the processing time available between PDSCH data reception in subframe n and the corresponding HARQ-ACK feedback transmission may be reduced for 1-ms TTI. Thus, instead of transmitting the HARQ-ACK feedback in UL TTI n+4, feedback in TTI n+3 or even in TTI n+2 may be supported.

Certain embodiments, therefore, may provide UL control signaling techniques and systems for facilitating continuous DL transmission without any scheduling restrictions in the case when dynamic switching between 1-ms and 2-OS TTIs is supported in the DL.

Certain embodiments provide a definition of joint HARQ-ACK feedback timing covering both 2-OS sTTI as well as 1-ms TTI. In certain cases with a 2-OS sTTI, UE can be scheduled with sPDSCH only up to six sTTIs per subframe, because the first 2-OS TTI in the downlink is occupied by the PDCCH. The legacy PDCCH for system bandwidth (BW)>1.25 MHz can occupy 1-3 OFDM symbols and therefore at most 6 2-OS sTTIs can be scheduled in DL.

Figure 1:
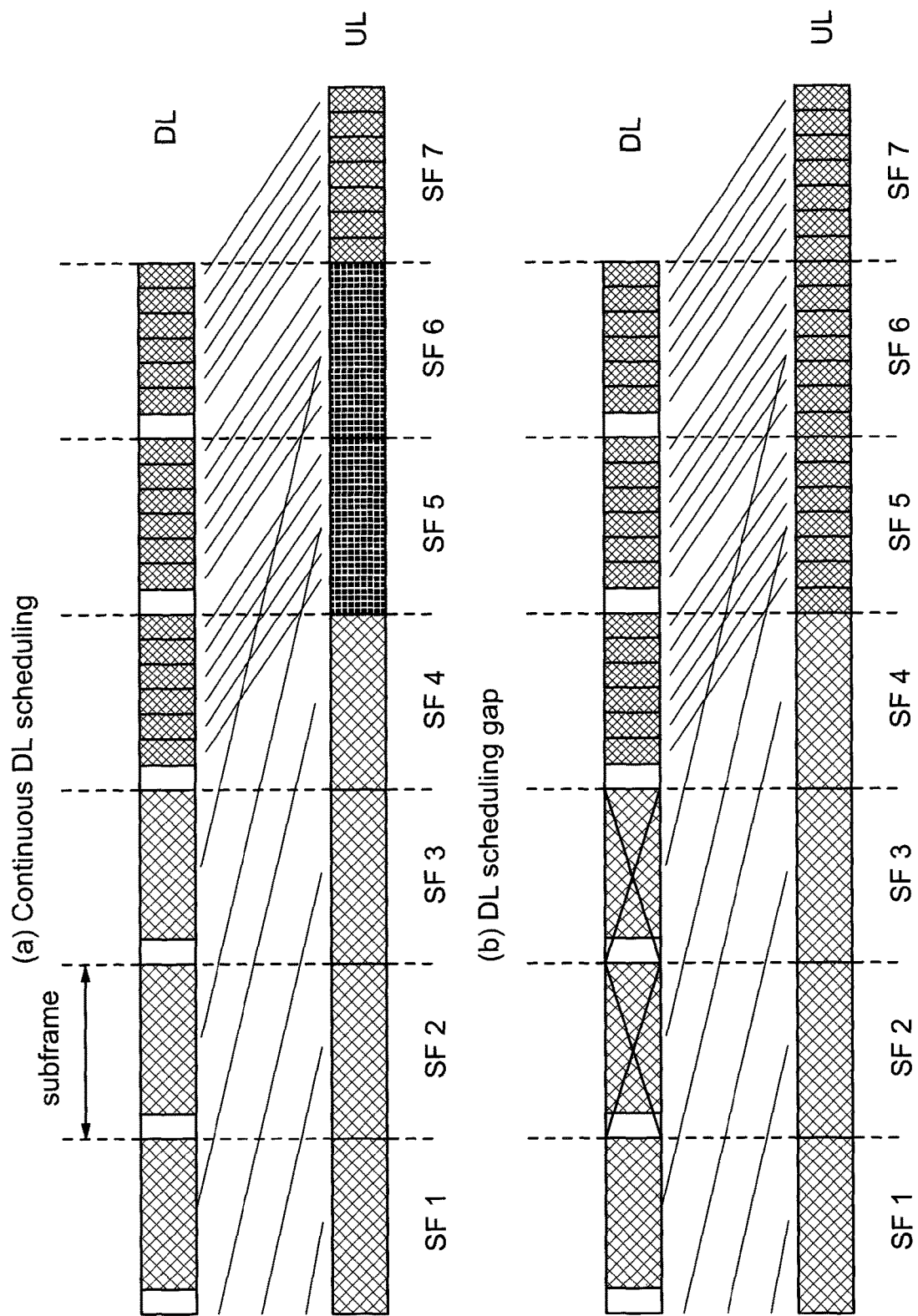
FIG. 1 illustrates feedback when a transmission time interval changes.
Figure 2:
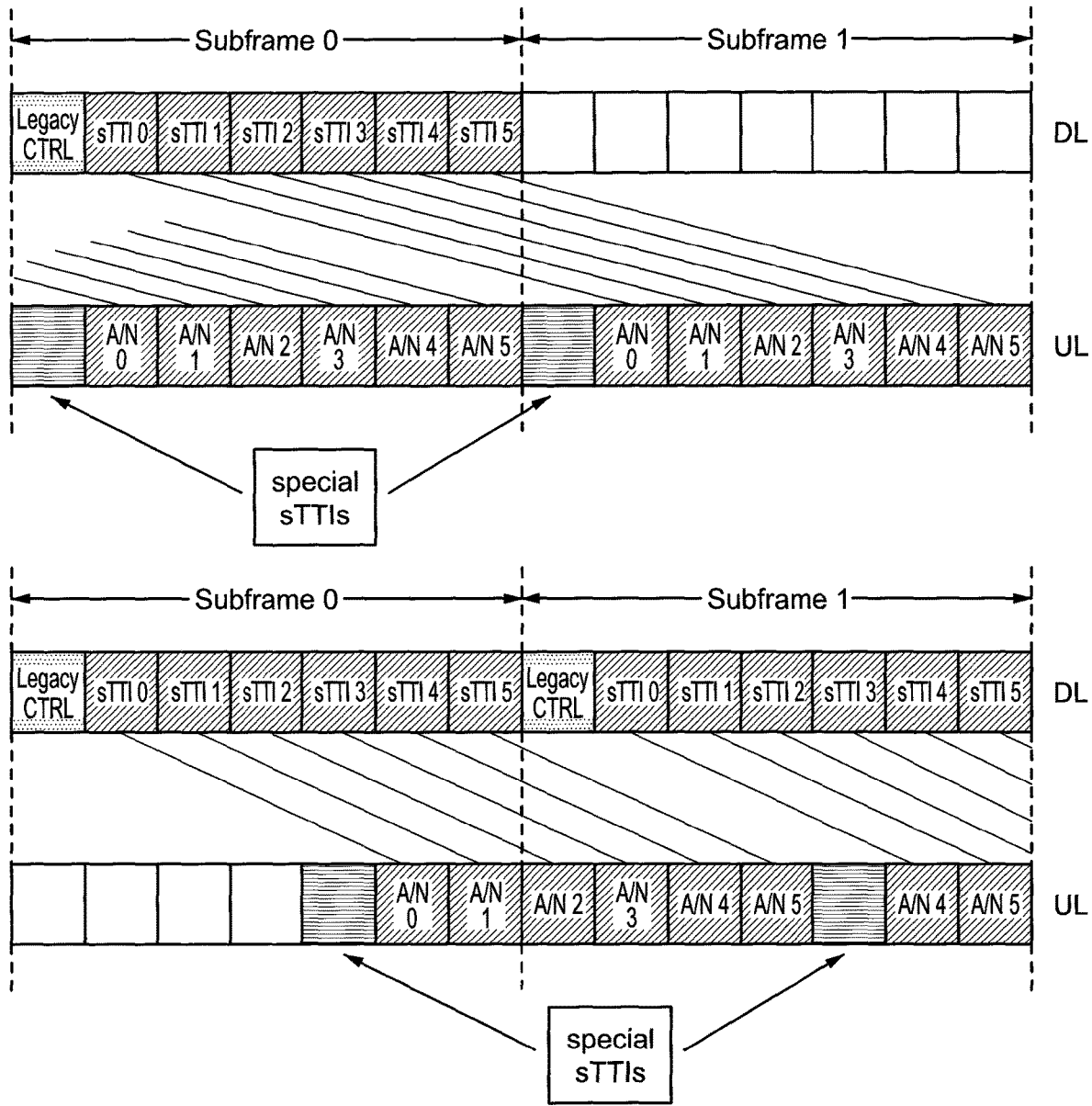
FIG. 2 illustrates timing relationship between sPDSCH transmissions and sPUCCH resources, according to certain embodiments.

FIG. 2 illustrates timing relationship between sPDSCH transmissions and sPUCCH resources, according to certain embodiments. More particularly, FIG. 2 illustrates a timing relation between sPDSCH transmissions and sPUCCH resources in case of 2-OS sTTI both in UL and DL. The upper part of FIG. 2 illustrates HARQ-ACK feedback delay corresponding to 7 sTTIs. The lower part of FIG. 2 illustrates HARQ-ACK feedback delay corresponding to 4 sTTIs.

As depicted in FIG. 2 PDCCH control (CTRL) can be spread over 2 OFDM symbols (other arrangements are possible, for example PDCCH can take 1 to 3 symbols in typical cases, and can take 2 to 4 symbols with 1.4 MHz bandwidth and Frame structure 2, as mentioned above). In such a case, there can be one sPUCCH sTTI per subframe that is not needed for carrying HARQ-ACK feedback for sPDSCH. In an example, HARQ-ACK feedback delay may be 7 sTTIs from the start of the sPDSCH transmission to the start of HARQ-ACK feedback transmission. This case is shown in the upper part of FIG. 2. A vacant UL sTTI denoted here as special sTTI can be, as in this example, the first UL sTTI in each subframe. The HARQ-ACK delay may be smaller or larger than 7 sTTIs, in other embodiments with 7 sTTIs being just an example. For another example, shown in the lower part of FIG. 2, feedback delay can be 4 sTTIs and special sTTI is located in the middle of the subframe.

Given that one of the 7 UL sTTIs may be unoccupied in each UL subframe, certain embodiments can allow for transmission of HARQ-ACK corresponding to a 1-ms DL PDSCH TTI in that special sTTI.

Figure 3:
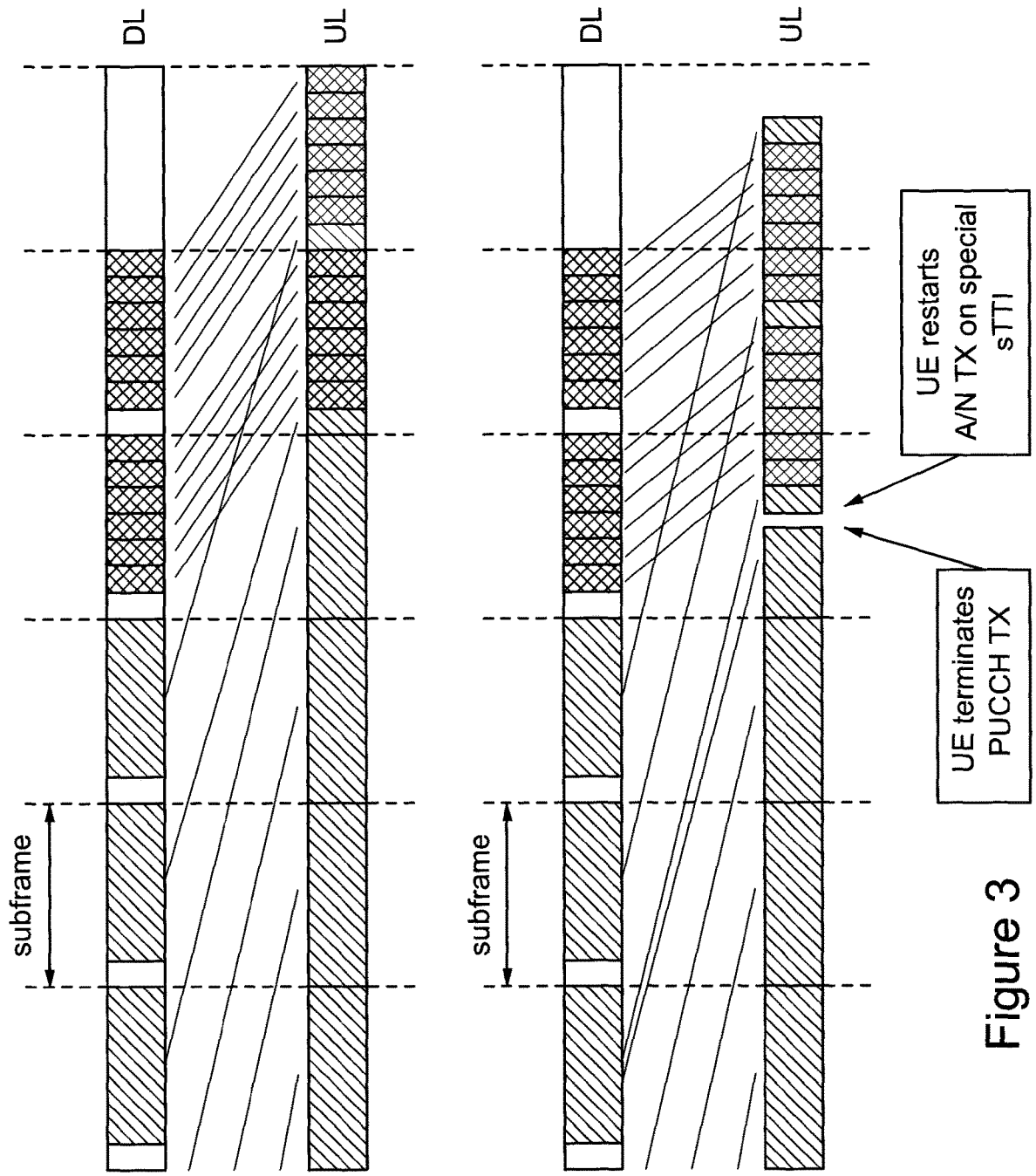
FIG. 3 illustrates how special sTTIs can be used, according to certain embodiments.

FIG. 3 illustrates how special sTTIs can be used, according to certain embodiments. There can be dynamic selection between sending the HARQ-ACK feedback for a 1-ms DL PDSCH TTI either using 1-ms UL TTI on either PUCCH or PUSCH, or using 2-OS sTTI, for example the special sTTI.

A rule for selecting where to transmit HARQ-ACK feedback can be as follows: after receiving a DL assignment scheduling DL data transmission on PDSCH in 1-ms TTI n, the UE shall transmit the corresponding HARQ-ACK feedback in the UL in 1-ms TTI n+k (where k is predetermined, and can be for example 2, 3, or 4), unless the UE receives one or more downlink assignments scheduling DL data transmissions on sPDSCH using sTTI, which should be acknowledged during the same UL subframe; in the latter case the UE shall transmit HARQ-ACK feedback for the DL data transmission received on PDSCH in 1-ms TTI n, in the UL 2-OS sTTI m, where m is the special sTTI for or in the subframe n+k. This is one example of such a rule.

Another example rule for selecting where to transmit HARQ-ACK feedback can be as follows: after receiving a DL assignment scheduling DL data transmission on PDSCH in 1-ms TTI n, the UE shall transmit the corresponding HARQ ACK feedback in the UL in 1-ms TTI n+k (where k is predetermined, and can be for example 2, 3, or 4), unless the UE receives one or more uplink grants for UL data transmissions on sPUSCH using sTTI during the same UL subframe n+k; in the latter case the UE shall transmit HARQ-ACK feedback for the DL data transmission received on PDSCH in 1-ms TTI n, in the UL 2-OS sTTI m, where m is the special sTTI for or in the subframe n+k. This rule may be applicable to a case in which a short PUSCH (UL data) and 1-ms HARQ-ACK would collide. Other rules are also permitted.

The principle is illustrated in FIG. 3, where the upper figure illustrates n+7 timing for 2-OS sTTI and the bottom figure illustrates n+4 timing of 2-OS sTTI. The 1 ms TTI has n+3 timing in both illustrated cases although other timings for 1 ms TTI are possible too. In the case of n+4 timing for 2-OS sTTI, the UE may already start 1 ms PUCCH transmission while decoding the sPDSCH DL assignment triggering ACK-NACK, or a UL grant triggering sPUSCH transmission within the same UL subframe. In this case, the UE can terminate the 1 ms PUCCH transmission immediately and can resend the ACK/NACK of 1 ms PDSCH using the special sTTI instead.

A UE operating with reduced latency can always prepare short sPUCCH and long (1 ms) PUCCH HARQ-ACKs in advance. Upon reception of sPDSCH grant requiring acknowledgment within the same subframe, or a UL grant scheduling sPUSCH transmission within the same subframe, the UE may transmit sPUCCH in a special sTTI as soon as DL grant has been decoded. In the example in the bottom part of FIG. 3, the UE has at least one sTTI to decode the DL assignment.

A further aspect of certain embodiments is that the sPUCCH resource allocation corresponding to PDSCH data can be determined based on the 1-ms TTI. For example, when the DL data has been scheduled using PDCCH, the sPUCCH resource can be determined based on the lowest CCE index of the DCI scheduling the PDSCH data transmission. The sPUCCH resource starting point, for example in terms of physical resource block (PRB) index and code domain resources such as cyclic shift, can be separately RRC configured for the special sTTI.

Figure 4:
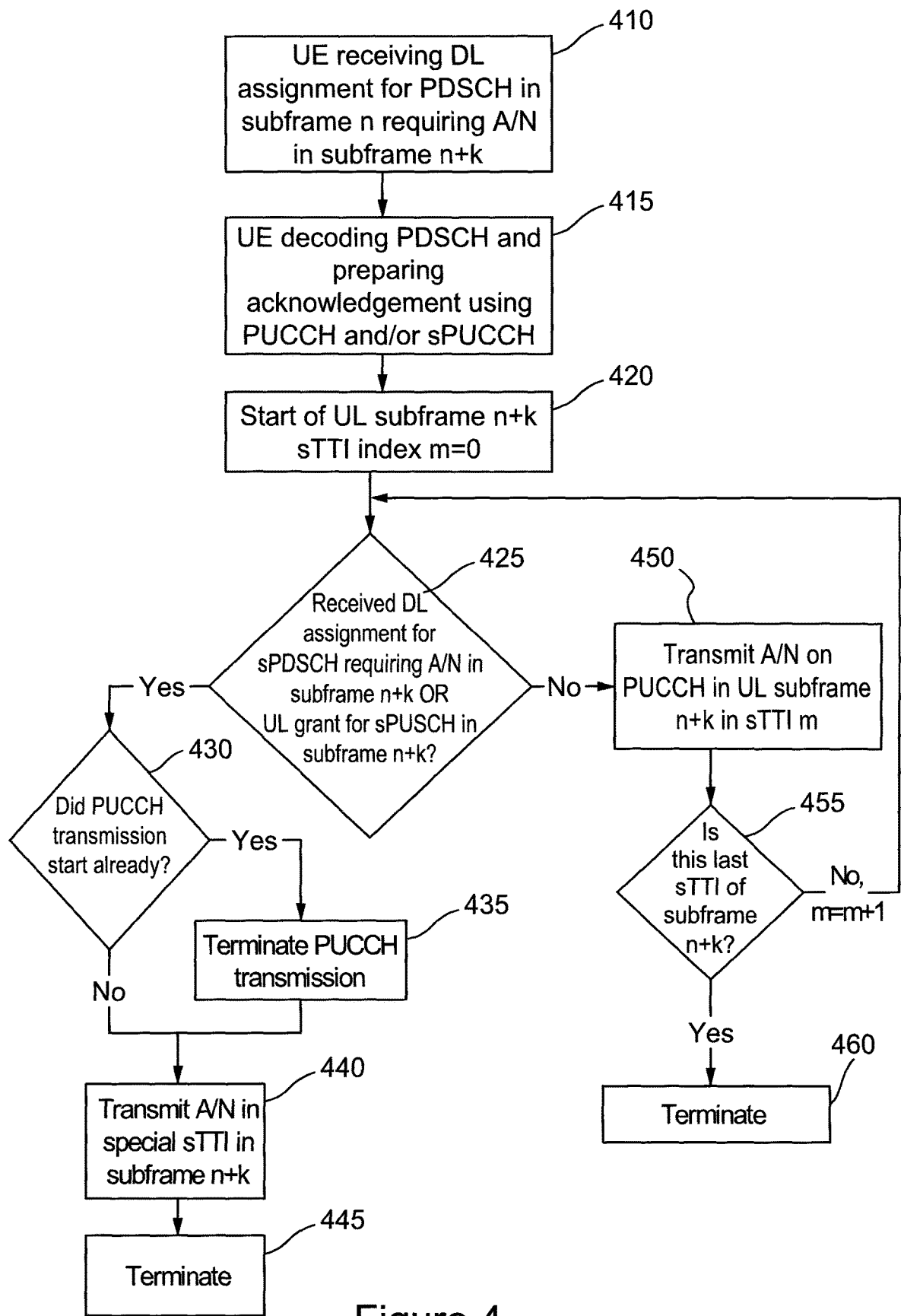
FIG. 4 illustrates the determination of acknowledgement/negative acknowledgement (A/N) transmission, according to certain embodiments.

FIG. 4 illustrates HARQ acknowledgement/negative acknowledgement (A/N) transmission, according to certain embodiments. The flow chart of FIG. 4 illustrates A/N transmission of PDSCH received in subframe n, on PUCCH transmitted in subframe n+k or on sPUCCH transmitted in special sTTI in subframe n+k.

The eNB can have full dynamic flexibility of scheduling PDSCH or one or more sPDSCH or sPUSCH in any subframe. The UE can transmit HARQ-ACK for PDSCH transmitted in subframe n using PUCCH in subframe n+k or sPUCCH in special sTTI in subframe n+k according to flow chart diagram in FIG. 4.

More particularly, as shown in FIG. 4, at 410, a user equipment (UE) can receive a downlink (DL) assignment for physical downlink shared channel (PDSCH) in subframe n requiring A/N in subframe n+k.

At 415, the UE can decode physical downlink shared channel (PDSCH) and prepare acknowledgement using physical uplink control channel (PUCCH) and/or short PUCCH (sPUCCH). At 420, there can be the start of uplink (UL) subframe n+k with sTTI index m=0.

At 425, the UE can determine whether the UE has received a DL assignment for sPDSCH requiring A/N in subframe n+k, and/or a UL grant scheduling sPUSCH transmission in subframe n+k. If so, then at 430 the UE can determine whether PUCCH transmission already started. If so, the UE can terminate PUCCH transmission at 435. Otherwise, at 440, if the PUCCH transmission has not started or has already terminated the UE can transmit sPUCCH or sPUSCH in a special sTTI in subframe n+k, and then the process can terminate at 445. If sPUSCH has been scheduled for the special sTTI, UE may send A/N for PDSCH e.g. by puncturing data of the sPUSCH.

If, at 425, it is determined that the UE has not received a DL assignment for sPDSCH requiring A/N in subframe n+k, or a UL grant scheduling sPUSCH transmission in subframe n+k, then at 450 the UE can transmit or continue transmitting A/N on PUCCH in UL subframe n+k in sTTI m.

At 455, the UE can determine if the current sTTI is the last sTTI of subframe n+k. If not, the counter m can be incremented and the process can revert to step 425 for the next sTTI. When the last sTTI is reached, the process can terminate at 460.

Figure 5:
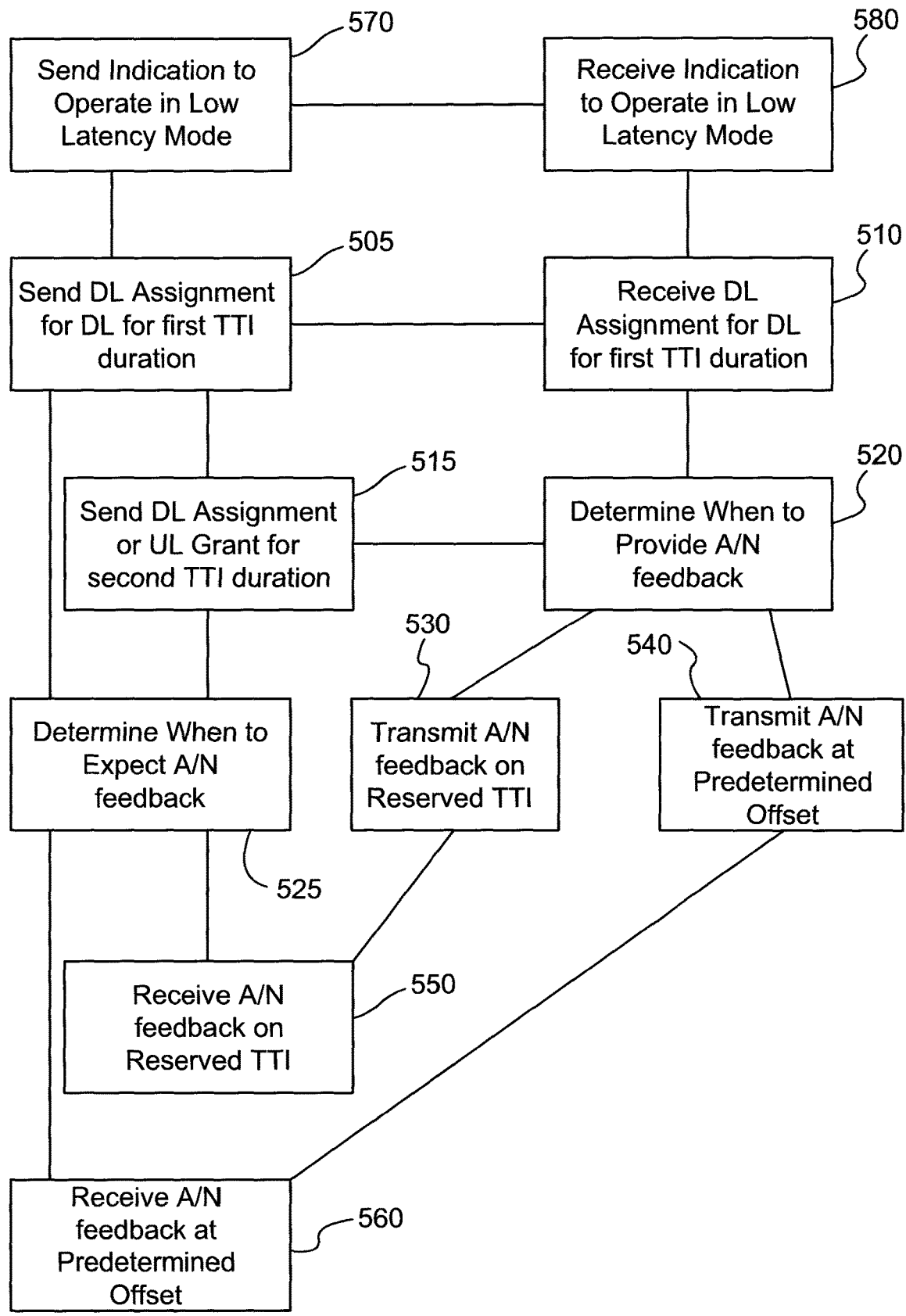
FIG. 5 illustrates a method according to certain embodiments.

FIG. 5 illustrates a method according to certain embodiments. As shown in FIG. 5, a method can include, at 510, receiving, at a user equipment, a downlink assignment scheduling downlink data transmission in a first transmission time interval duration. The first downlink data transmission can be a physical downlink shared channel. The first transmission time interval duration can be one millisecond.

The method can also include, at 520, determining when to provide acknowledgment feedback in an uplink corresponding to the scheduled downlink data transmission. The determination can take into account whether transmitting the acknowledgement feedback in a given subframe would collide with signaling associated with a second transmission time interval duration. The collision can be that the user equipment is scheduled for downlink data transmission in the second transmission time interval duration requiring the acknowledgment feedback in the given subframe or is scheduled for uplink data transmission in the given subframe. The second transmission time interval duration can be shorter than the first transmission time interval duration. The second downlink data transmission can be a short physical downlink shared channel. The uplink data transmission can be a scheduled short physical uplink shared channel transmission in the given subframe. The second transmission time interval duration can be two orthogonal frequency division multiplex symbols.

When the user equipment is scheduled for downlink or uplink data transmission in the second transmission time interval duration, the method can further include, at 530, transmitting the acknowledgment feedback corresponding to the first transmission interval duration in a reserved transmission time interval of the second transmission time interval duration. The reserved transmission time interval can be a special short transmission time interval. Optionally, the reserved transmission time interval can be a transmission time interval in which acknowledgment feedback for the second transmission time interval duration cannot be sent. Thus, this reserved transmission time interval may be reserved only in the sense that sTTI-related acknowledgments are not to be sent during this interval. This can be the transmission time interval described as m in the above examples.

When the user equipment is not scheduled for downlink or uplink data transmission in the second transmission time interval duration, the method can further include, at 540, transmitting the acknowledgment feedback corresponding to the first transmission interval duration in a transmission time interval having a predetermined offset. This can be the transmission time interval identified as n+k in the examples above, where n is the downlink transmission time interval and k is the predetermined offset to the uplink transmission time interval in which acknowledgment is to be transmitted-. The predetermined offset can be an integer number of transmission time intervals.

The above-described features can be performed by a device such as a user equipment. The following features of the method illustrated in FIG. 5 can be performed by a network element, such as an access node.

For example, the method can include, at 505, sending, to the user equipment, the downlink assignment scheduling first downlink data transmission in the first transmission time interval duration. This can be the same assignment received at 510.

The method can also include determining, at 525, when to expect acknowledgment feedback in an uplink corresponding to the scheduled downlink data transmission. The determination can take into account whether the user equipment is scheduled for downlink or uplink data transmission in a second transmission time interval duration, which may have been a DL assignment or an UL grant sent at 515.

When the user equipment is scheduled for second downlink data transmission in the second transmission time interval duration, or the user equipment is scheduled for an uplink data transmission in the second transmission time interval duration, the method can further include, at 550, receiving the acknowledgment feedback corresponding to the first transmission interval duration in a reserved transmission time interval of the second transmission time interval duration, as mentioned above.

When the user equipment is not scheduled for downlink or uplink data transmission in the second transmission time interval duration, the method can further include, at 560, receiving the acknowledgment feedback corresponding to the first transmission interval duration in a transmission time interval having a predetermined offset.

The method can further include, at 570, sending an indication to operate in low latency mode. The indication can be received at 580. The indication can be sent using, for example, radio resource control configuration.

Figure 6:
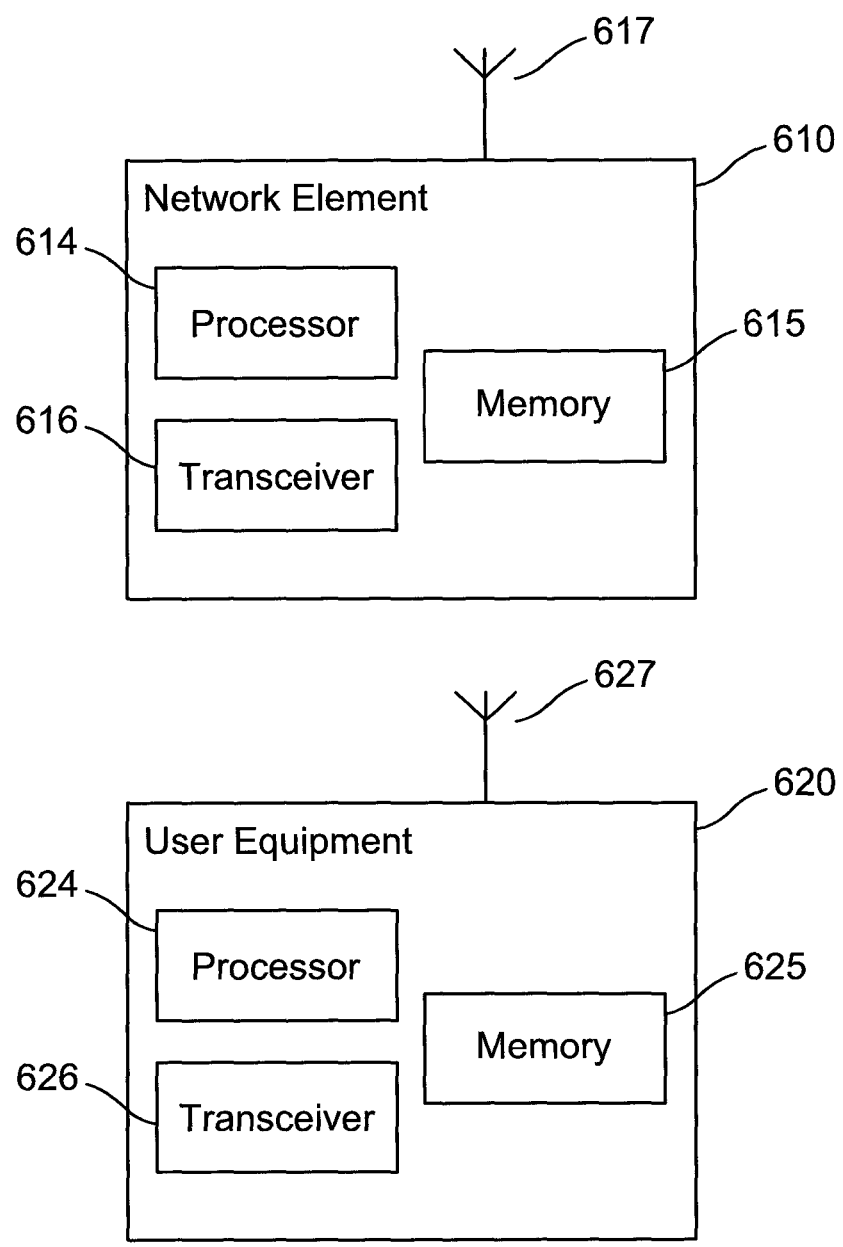
FIG. 6 illustrates a system according to certain embodiments.

FIG. 6 illustrates a system according to certain embodiments of the invention. It should be understood that each block of the flowcharts of FIG. 4 and FIG. 5 may be implemented by various means or their combinations, such as hardware, software, firmware, one or more processors and/or circuitry. In one embodiment, a system may include several devices, such as, for example, network element 610 and user equipment (UE) or user device 620. The system may include more than one UE 620 and more than one network element 610, although only one of each is shown for the purposes of illustration. A network element can be an access point, a base station, an eNode B (eNB), or any other network element.

Each of these devices may include at least one processor or control unit or module, respectively indicated as 614 and 624. At least one memory may be provided in each device, and indicated as 615 and 625, respectively. The memory may include computer program instructions or computer code contained therein, for example for carrying out the embodiments described above. One or more transceiver 616 and 626 may be provided, and each device may also include an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example.

A user device or user equipment 620 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 620 may be a sensor or smart meter, or other device that may usually be configured for a single location.

In an exemplifying embodiment, an apparatus, such as a node or user device, may include means for carrying out embodiments described above in relation to FIGS. 4 and 5.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIGS. 4 and 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, in certain embodiments multiplexing of HARQ-ACK corresponding to 1 ms DL TTI and 2-OS DL sTTI, or multiplexing of HARQ-ACK corresponding to 1 ms DL TTI and a UL data transmission using 2-OS sTTI for the same UE can be supported without any scheduling limitations. Additionally, certain embodiments allow for dynamic switching between HARQ-ACK transmission using 1-ms UL TTI or 2-OS UL TTI without any additional signaling overhead. This can help in maintaining UL coverage. Likewise, certain embodiments may be applied to other communication systems supporting multiple TTI lengths, such as 5G/new radio.

Another option would be to multiplex the HARQ-ACK corresponding to 1-ms TTI onto sPUCCH sTTI carrying HARQ-ACK for 2-OS sTTI, or to multiplex the HARQ-ACK corresponding to a 2-OS sTTI onto PUCCH carrying HARQ-ACK for 1-ms TTI. In either of these cases, the number of HARQ-ACK feedback bits would need to be dimensioned according to the worst case, resulting in deteriorated coverage in cases when fewer bits would suffice. Alternatively, the HARQ-ACK feedback bits could be bundled using a logical AND operation. The downside of this approach is that the UE and the eNodeB might in the case of DL DCI signaling errors end up having a different understanding on the number of HARQ-ACK provided.

A solution is that PUCCH, carrying feedback for 14-OS transmissions, and sPUCCH, carrying feedback for 2-OS transmissions, are transmitted simultaneously in UL. Such simultaneous transmission of PUCCH and sPUCCH would mean loss of beneficial single carrier properties of the uplink (UL) waveform. Furthermore, complex rules for dividing transmission power between the channels would be needed in order to cope with power limited situation and because of sPUCCH transmissions starting and possibly also ending in the middle of PUCCH transmission. Similarly, when sPUSCH is scheduled in the same UL subframe where ACK on PUCCH should be transmitted, the simultaneous transmission of PUCCH and sPUSCH would result into the same issues as simultaneous transmission of PUCCH and sPUCCH.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP Third Generation Partnership Program
A/N Acknowledgement/Negative acknowledgement
ACK Acknowledgement
CCE Control Channel Element
CRC Cyclic Redundancy Check
DL Downlink
DMRS Demodulation Reference Signal
eNB Enhanced NodeB
EPDCCH Enhanced PDCCH
FDD Frequency Division Duplexing
HARQ Hybrid Automatic Retransmission request LTE Long Term Evolution
OFDM Orthogonal Frequency Division Multiplexing
OS OFDM Symbol
PDCCH Physical Downlink Control Channel
PDSCH Physical Downlink Shared Channel
PMI Precoding Matrix Indicator
PRB Physical Resource Block
PUCCH Physical Uplink Control Channel
PUSCH Physical Uplink Shared Channel
RAN Radio Access Network
Rel Release
RI Rank Indicator
RRC Radio Resource Control
RS Reference Signal
RV Redundancy Version
SC-FDMA Single Carrier Frequency Division Multiple Access
SI Study Item
sPDSCH Short PDSCH
sPUCCH Short PUCCH
sPUSCH Short PUSCH
sTTI Short Transmission Time Interval
TDD Time Division Duplexing
TDM Time Division Multiplexing
TSG Technical Specification Group
TTI Transmission Time Interval
UCI Uplink Control Information
UE User Equipment
UL Uplink
WG Working Group
WI Work Item

We claim:

1. A method, comprising:
   receiving, at a user equipment, a downlink assignment scheduling a first downlink data transmission in a first transmission time interval duration; and
   determining when to provide acknowledgment feedback in an uplink corresponding to the scheduled first downlink data transmission,
   wherein the determination takes into account whether transmitting the acknowledgement feedback in a given subframe would collide with transmission associated with a second transmission time interval duration;
   wherein the collision is that the user equipment is scheduled for transmitting in the given subframe the acknowledgment feedback for the first downlink data transmission in the second transmission time interval duration corresponding to a second downlink data transmission or is scheduled for uplink data transmission in the given subframe, and
   wherein the second transmission time interval duration is shorter than the first transmission time interval duration.

2. The method of claim 1, further comprising:
   when the user equipment is scheduled for receiving the second downlink data transmission or transmitting the uplink data transmission in the second transmission time interval duration, transmitting the acknowledgment feedback corresponding to the first transmission interval duration in a reserved transmission time interval of the second transmission time interval duration.

3. The apparatus of claim 2, wherein the reserved transmission time interval comprises one of:
   a special short transmission time interval; and
   a transmission time interval in which acknowledgment feedback for the second transmission time interval duration cannot be sent.

4. The method of claim 1, wherein the first downlink data transmission comprises a physical downlink shared channel, and wherein the first transmission time interval duration is one millisecond; wherein the second downlink data transmission comprises a short physical downlink shared channel, and wherein the second transmission time interval duration comprises two orthogonal frequency division multiplex symbols; and wherein the uplink data transmission is a scheduled short physical uplink shared channel transmission in the given subframe.

5. An apparatus, comprising:
   at least one processor; and
   at least one non-transitory memory including computer program code,
   wherein the at least one memory and the computer program code are configured to, with the at least one processor, to cause the apparatus to at least:
   receive, at a user equipment, a downlink assignment scheduling a first downlink data transmission in a first transmission time interval duration; and
   determine when to provide acknowledgment feedback in an uplink corresponding to the scheduled first downlink data transmission,
   wherein the determination takes into account whether transmitting the acknowledgement feedback in a given subframe would collide with transmission associated with a second transmission time interval duration;
   wherein the collision is that the user equipment is scheduled for transmitting in the given subframe the acknowledgment feedback for the first downlink data transmission in the second transmission time interval duration corresponding to a second downlink data transmission or is scheduled for uplink data transmission in the given subframe, and
   wherein the second transmission time interval duration is shorter than the first transmission time interval duration;
   wherein the apparatus forms at least part of a user equipment.

6. The apparatus of claim 5, wherein the uplink data transmission is a scheduled short physical uplink shared channel transmission in the given subframe.

7. The apparatus of claim 5, wherein the at least one memory and the computer program code are further configured to, with the at least one processor, cause the apparatus to at least:
   when the user equipment is scheduled for receiving the second downlink data transmission or transmitting the uplink data transmission in the second transmission time interval duration, transmit the acknowledgment feedback corresponding to the first transmission interval duration in a reserved transmission time interval of the second transmission time interval duration.

8. The apparatus of claim 7, wherein the reserved transmission time interval comprises one of:
   a special short transmission time interval; and
   a transmission time interval in which acknowledgment feedback for the second transmission time interval duration cannot be sent.

9. The apparatus of claim 5, wherein the at least one memory and the computer program code are further configured to, with the at least one processor, cause the apparatus to at least:
   when the user equipment is not scheduled for receiving the second downlink data transmission or transmitting the uplink data transmission in the second transmission time interval duration, transmit the acknowledgment feedback corresponding to the first transmission interval duration in a transmission time interval having a predetermined offset.

10. The apparatus of claim 5, wherein the first downlink data transmission comprises a physical downlink shared channel, and the first transmission time interval duration is one millisecond.

11. The apparatus of claim 5, wherein the second downlink data transmission comprises a short physical downlink shared channel, and the second transmission time interval duration comprises two orthogonal frequency division multiplex symbols.

12. The apparatus of claim 5, wherein the at least one memory and the computer program code are further configured to, with the at least one processor, cause the apparatus to at least:
receive an indication to operate in low latency mode, and wherein the indication is provided by radio resource control configuration.

13. An apparatus, comprising:
at least one processor; and
at least one non-transitory memory including computer program code,
wherein the at least one memory and the computer program code are configured to, with the at least one processor, to cause the apparatus to at least:
send, to a user equipment, a downlink assignment scheduling a first downlink data transmission in a first transmission time interval duration; and
determine when to expect acknowledgment feedback in an uplink corresponding to the scheduled first downlink data transmission,
wherein the determination takes into account whether the user equipment is scheduled for receiving a second downlink data transmission or transmitting an uplink data transmission in a second transmission time interval duration that would collide with a transmission of the acknowledgement feedback,
wherein the collision is that the user equipment is scheduled for transmitting the acknowledgment feedback for the first downlink data transmission in the second transmission time interval duration corresponding to the second downlink data transmission or is scheduled for uplink data transmission in the second transmission time interval duration; and
wherein the second transmission time interval duration is shorter than the first transmission time interval duration.

14. The apparatus of claim 13, wherein the at least one memory and the computer program code are further configured to, with the at least one processor, cause the apparatus to at least:
when the user equipment is scheduled for receiving the second downlink data transmission or transmitting the uplink data transmission in the second transmission time interval duration, receive the acknowledgment feedback corresponding to the first transmission interval duration in a reserved transmission time interval of the second transmission time interval duration.

15. The apparatus of claim 14, wherein the reserved transmission time interval comprises one of:
a special short transmission time interval, and
a transmission time interval in which acknowledgment feedback for the second transmission time interval duration cannot be sent.

16. The apparatus of claim 13, wherein the at least one memory and the computer program code are further configured to, with the at least one processor, cause the apparatus to at least:
when the user equipment is not scheduled for receiving the second downlink data transmission or transmitting the uplink data transmission in the second transmission time interval duration, receive the acknowledgment feedback corresponding to the first transmission interval duration in a transmission time interval having a predetermined offset.

17. The apparatus of claim 13, wherein the at least one memory and the computer program code are further configured to, with the at least one processor, cause the apparatus to at least:
send an indication to operate in low latency mode, and wherein the indication is sent by radio resource control configuration.

18. The apparatus of claim 13, wherein the first downlink data transmission comprises a physical downlink shared channel, and wherein the first transmission time interval duration is one millisecond.

19. The apparatus of claim 13, wherein the second downlink data transmission comprises a short physical downlink shared channel, and wherein the second transmission time interval duration comprises two orthogonal frequency division multiplex symbols.

20. The apparatus of claim 13, wherein the uplink data transmission is a scheduled short physical uplink shared channel transmission in the given subframe.

* * * * *